March 31, 1970     J. B. TRAVIS     3,503,566
CANOPY CONTAINER AND TENSIONING DEVICE
Filed Aug. 13, 1968
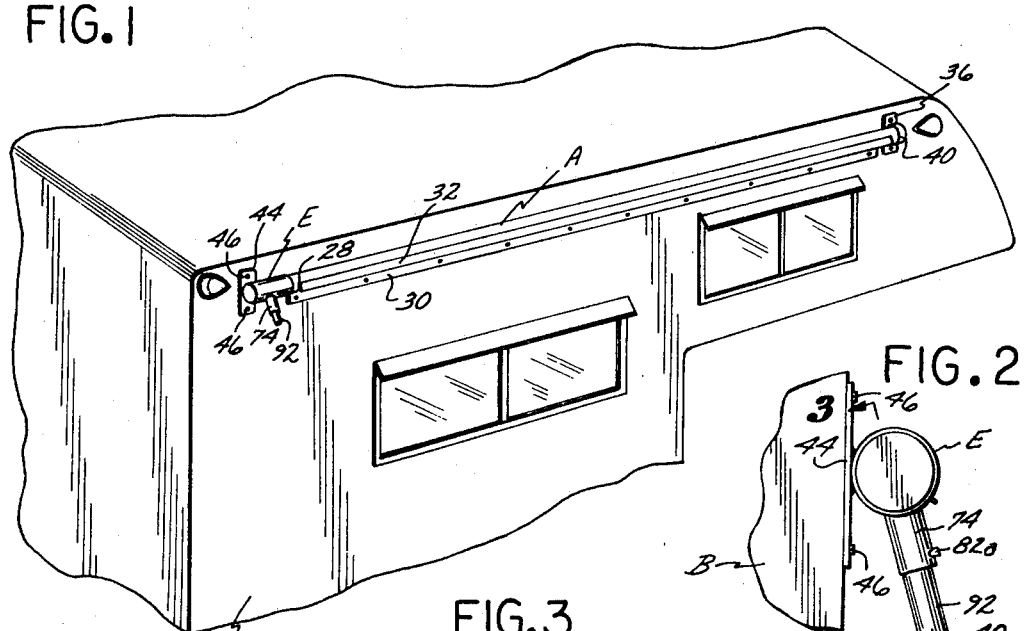
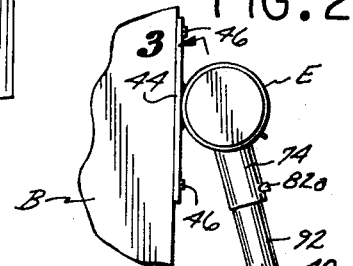
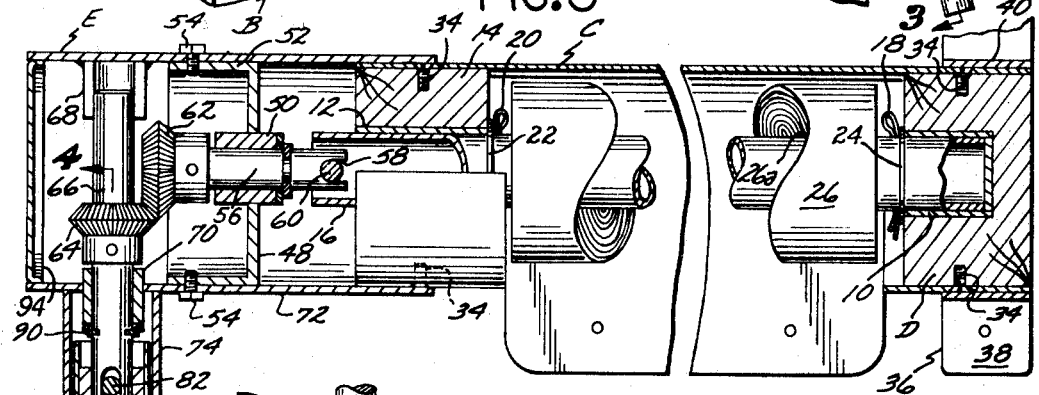
INVENTOR.
JESSE B. TRAVIS
BY
William G. Babcock
ATTORNEY

United States Patent Office 3,503,566
Patented Mar. 31, 1970

---

3,503,566
CANOPY CONTAINER AND TENSIONING DEVICE
Jesse B. Travis, 7051 9th St., Buena Park, Calif. 90620
Filed Aug. 13, 1968, Ser. No. 752,216
Int. Cl. E04f *10/02;* B65h *75/38*
U.S. Cl. 242—55
6 Claims

ABSTRACT OF THE DISCLOSURE

A device for so containing and supporting a generally rectangular sheet of pliable material on a side wall of a building structure or vehicle, which when a free end of the sheet is extended in a fixed position from the side wall, is adapted to exert tension on the sheet to provide a taut canopy.

BACKGROUND OF THE INVENTION

Field of the invention

A device for so supporting a sheet of pliable material from a vehicle such as a trailer, camper, boat, or the like, as well as a garage or other suitable building side wall, in such a manner that when the sheet is in either an extended or partially extended position it may be tensioned to define a taut canopy.

Description of the prior art

With the increased use of vehicles which are used not only for transportation, but as permanent or temporary living quarters, it is desirable upon arriving at a predetermined destination to be able to quickly and easily place the sheet material in an elevated, taut position to provide a canopy under the shade of which a comfortable outdoor area may be used for eating, relaxing, and even sleeping on occasion.

Heretofore the provision of such a canopy which protectively extends outwardly from the side wall of a vehicle or other structure has been a time-consuming and laborious job, with the resulting canopy oftentimes being supported in a loose, drooping and unsteady position. The present invention is directed to a compact, lightweight unit that may be easily mounted on a vehicle side wall which may be used to provide a canopy at a desired location that is not only taut, but free of the operational disadvantages of prior equipment of this type available on the present day market.

SUMMARY OF THE INVENTION

The present invention includes an elongate housing assembly that rotatably supports a rectangular sheet of pliable material within the confines thereof, with the sheet being adapted to be withdrawn to a desired extent therefrom to provide a taut canopy. The housing assembly may be either permanently or temporarily secured to a side wall of a vehicle, building structure, or the like.

A major object of the present invention is to provide a container and support for a sheet of pliable material that is normally disposed in the configuration of a compact roll, with the sheet being adapted to be withdrawn from the container a predetermined extent to provide a taut canopy.

Another object of the invention is to furnish a container and support for a sheet of pliable material, with the container and support being adapted to be easily mounted on a side wall of a vehicle, and from which the sheet situated in the container may be easily withdrawn a desired degree to provide a canopy.

A further object of the invention is to provide a container and support for a sheet of pliable material which is of relatively simple mechanical structure formed from standard, commercially available materials, compact, lightweight, and readily mounted on, or demounted from a side wall of a vehicle, or the like.

BRIEF DESCRIPTION OF THE DRAWING

FIGURE 1 is a perspective view of the canopy support and container mounted in an elevated position on the side wall of a camper;

FIGURE 2 is an end elevational view of the device;

FIGURE 3 is a longitudinal cross-sectional view of the support and container;

FIGURE 4 is a transverse cross-sectional view of the device, taken on the line 4—4 of FIGURE 3; and FIGURE 5 is a fragmentary top plan view of a portion of the device.

DESCRIPTION OF THE PREFERRED EMBODIMENT

The canopy support and housing A is shown mounted in an elevated position on a side wall of a vehicle B in FIGURE 1. Although the vehicle B is illustrated as a camper, it will be apparent that it may be mounted in the same manner on a trailer, superstructure of a boat, building structure, or the like.

The canopy support A includes an elongate tubular housing C that is closed on a first end by a first end piece D, and on the second end by a cup E. End piece D supports a first sleeve type bearing 10. A second sleeve type bearing 12 is supported in axially aligned relationship in housing C by a second end piece 14.

End pieces D and 14 may be formed from wood, or other material that may be penetrated by a screw without difficulty. An elongate tubular member 16 is longitudinally positioned in housing C, with the end portions of this member being rotatably supported in first and second bearings 10 and 12. First and second cotter pins 18 and 20 extend transversely through member 16, and maintain first and second washers 22 and 24 adjacent to the interior surfaces of end pieces D and 14 in the manner shown in FIGURE 1. Cotter pins 18 and 20 and washers 22 and 24 cooperatively prevent longitudinal movement of member 16 relative to bearings 10 and 12. The tubular member 16 positioned between the cotter pins 18 and 20 supports a rectangular sheet 26 of pliable material in roll form thereon. One edge 26a of sheet 26 is secured to member 16 by conventional means.

A longitudinal slit 28 is defined in housing C through which sheet 26 extends. An edge of sheet 26 outside housing C is connected to an elongate header 30 of sufficient transverse cross section as to not pass through slit 28. A lip 32 extends outwardly from housing C above slit 28 to prevent entry of rain water or moisture within the confines of the housing.

End pieces D and 14 are secured to housing C by screws 34. A bracket 36 that includes a plate 38 and band 40, supports the first end of housing C from a surface 42 of the vehicle B. Cup E, as shown in FIGURE 3, slides over the second end of housing C. A plate 44 is secured to the rear of cup E, and this plate is secured to surface 42 by screws 46, or the like.

A circular plate 48 is disposed within cup E and supports a bearing 50. A ring-shaped flange 52 extends from plate 48 and is secured to the interior surface of cup E by screws 54. A first shaft 56 is rotatably supported in bearing 50. A transverse slot 58 is formed in a first end of shaft 56, and removably engages a transverse pin 60 in a second end of member 16. A second end of shaft 56 supports a first beveled gear 62.

Gear 62 engages a second beveled gear 64 mounted on a second shaft 66 that is disposed in a direction normal to that of shaft 56. A first end of shaft 66 is rotatably supported in a bearing 68 secured to the interior surface of cup E. A sleeve type bearing 70 is transversely supported by the side 72 of cup E and is in axial alignment with bearing 68. Bearing 70 is rotatably engaged by second shaft 66 which extends outwardly therethrough.

A cylindrical shell 74 is disposed in a direction normal to that of shell 72 and extends outwardly therefrom around a part of bear 70. A T-shaped slot 76 is formed in the outer portion of shell 74, as illustrated in FIGURE 5.

A longitudinal slot 78 is formed in the outer part of shaft 66. A tubular actuator is slidably mounted on the outer portion of shaft 66. Actuator 80 supports a transverse pin 82 that is slidably movable in slot 78. A transverse pin 84 extends across the outer portion of actuator 80. A compressed helical spring 86 is disposed within actuator 80, with one end of the spring bearing against pin 84 and the other end thereof against the outer portion of shaft 66. Spring 86 at all times tends to move actuator 80 outwardly relative to second shaft 66, but this outward movement is restricted due to the contact of pin 82 with the end portion 78a of slot 78. A transverse slot 88 is formed in the outer portion of actuator 80 that may be removably engaged by a conventional wrench or turning tool (not shown) by which the actuator may be rotated. The second beveled gear 64 and a ring 90 mounted on second shaft 66 rotatably engage opposite ends of sleeve 70 to prevent longitudinal movement of the second shaft relative to this sleeve.

It is preferable to provide a cylindrical sheath 92 which extends around the actuator 80. The pin 82, as may best be seen in FIGURES 4 and 5, has a projecting portion 82a that may be moved into or out of the slot 76. When the pin portion 82a is out of engagement with slot 76, the first and second shafts 56 and 66 are free to rotate, as is the elongate member 16 whereby the sheet material 26 may be drawn outwardly through slit 28 to a desired degree.

When the vehicle B is traveling, the device A normally would be in the retracted position shown in FIGURE 1. Upon arrival at the intended destination, the sheet material 26 is drawn from the housing C to the etxent that the header 30 can be secured by hooks (not shown), or other means, to an object a fixed distance from the vehicle.

After the header 30 has been secured in the manner described, the actuator 80 is engaged and rotated in a direction to roll the sheet material 26 onto member 16 until the exposed sheet material which defines a canopy is taut. Actuator is thereafter moved inwardly with further slow rotation to permit pin portion 82a to enter slot 76 and disposed in one of the circumferential leg portions 76a thereof. First and second shafts 56 and 66 and member 16 are then removably locked in fixed position. When the member 16 is in the locked position it holds the sheet material 26 in a taut canopy-defining condition.

To wind the sheet material 26 on the member 16 in the position shown in FIGURE 1, the above described operation is simply reversed. The cup E may be formed either as an integral unit, or of the two-piece structure shown in FIGURE 3. The two-piece structure includes the shell 72 and an end piece 94 welded or otherwise secured thereto.

I claim:

1. A device for so containing and supporting a generally rectangular sheet of pliable material on a side wall of a vehicle or building structure, which when a free end of said sheet is disposed in a fixed position from said side wall said sheet may be tensioned to provide a taut canopy, which device comprises:

(a) an elongated housing terminating in first and second ends and in which a longitudinal slit is formed;
(b) first and second bearings mounted in said first and second ends of said housing;
(c) an elongate member of circular transverse cross section rotatably supported by said bearings in said housing, with a first edge of said sheet being secured thereto, and with said sheet extending through said slit;
(d) a cylindrical cup in axial alignment with said housing and supported from said first end thereof, with said cup including a cylindrical shell extending outwardly therefrom and disposed in a direction normal to that of the longitudinal axis thereof, which shell is in communication with the interior of said cup, with a first slot being formed in the outer portion of said shell that includes longitudinal and transverse leg portions;
(e) first and second shafts disposed in a direction normal to one another and rotatably supported in said cup, with said first shaft being drivingly connected to said member and said second shaft having a longitudinal second slot formed therein;
(f) first and second gear means on the adjoining ends of said first and second shafts that drivingly connect the same;
(g) a tubular actuator slidably mounted on said second shaft;
(h) a first pin diametrically disposed in said actuator that slidably engages said second slot at all times, with said first pin including a projecting portion that can slidably engage said first slot;
(i) spring means that at all times tend to move said actuator outwardly relative to said second shaft;
(j) means for rotating said second shaft to rotate said elongate member to wind or unwind said sheet therefrom to provide a canopy of desired length, which sheet when tensioned to a desired degree is so held by said actuator when it is moved inwardly relative to said second shaft to dispose said projecting portion of said first pin in said transverse leg portion of said first slot; and
(k) means for supporting said housing and cap from said vehicle or building.

2. A device as defined in claim 1 which further includes:

(l) first and second end pieces mounted in said first and second ends of said housing, which end pieces support said first and second bearings.

3. A device as defined in claim 2 which further includes:

(m) a transverse plate mounted within said cup;
(n) a first bearing supported by said plate, which first bearing rotatably supports said first shaft; and
(o) second and third axially aligned bearings supported in spaced relationship in said cup and disposed in a direction normal to that of said first bearing, with said second and third bearings rotatably supporting said second shaft.

4. A device as defined in claim 2 which further includes:

(l) engageable means affixed to that end of said elongate member most adjacent said first shaft; and
(m) engaging means affixed to said first shaft that engage said engageable means for transmitting rotary motion of said actuator to said elongate member.

5. A device as defined in claim 2 wherein said cup is slidably mounted on said first end of said housing, which device further includes:

(l) means for removably holding said cup on said first end of said housing.

6. A device as defined in claim 2 which further includes:

(1) a longitudinal lip extending outwardly from said housing over said slit to prevent entry of rain water and other moisture into the confines of said housing.

References Cited

UNITED STATES PATENTS

| | | | |
|---|---|---|---|
| 300,962 | 6/1884 | Fox | 160—22 XR |
| 1,597,632 | 8/1926 | Stella | 160—22 XR |
| 1,854,037 | 4/1932 | Johnson | 242—100 XR |
| 2,811,321 | 10/1957 | La Barre | 242—86.52 |
| 3,327,724 | 6/1967 | Nielsen | 135—5 |
| 3,364,973 | 1/1968 | Railson | 160—22 |
| 3,450,186 | 6/1969 | Caffa et al. | 242—55 XR |

STANLEY N. GILREATH, Primary Examiner

WERNER H. SCHROEDER, Assistant Examiner

U.S. Cl. X.R.

135—5; 160—22; 242—86.52